United States Patent [19]

Gastineau et al.

[11] 4,066,633
[45] Jan. 3, 1978

[54] PROCESS FOR THE TREATMENT OF GREEN, LEAFY PLANTS FOR THE EXTRACTION OF PROTEINS IN THE PRESSING JUICES AND FOR ECONOMICAL DEHYDRATION OF CAKE

[75] Inventors: Charles Gastineau, Chalons-sur-Marne; Olivier de Mathan, Olivet; Jan-Dominique Dilly, Chalons-sur-Marne, all of France

[73] Assignee: France Luzerne, Paris, France

[21] Appl. No.: 628,369

[22] Filed: Nov. 3, 1975

[51] Int. Cl.² ............................................. A23J 1/14
[52] U.S. Cl. .............................................. 260/112 R
[58] Field of Search ................................. 260/112 R

[56] References Cited

U.S. PATENT DOCUMENTS

| 2,600,903 | 6/1952 | Miller | 426/311 X |
| 3,684,520 | 8/1972 | Bickoff et al. | 260/112 R X |
| 3,821,346 | 6/1974 | Batley | 260/112 R X |
| 3,823,128 | 7/1974 | Bickoff et al. | 260/112 R |
| 3,959,246 | 5/1976 | Bickoff et al. | 260/112 R |

Primary Examiner—Howard E. Schain
Assistant Examiner—W. C. Danison, Jr.
Attorney, Agent, or Firm—Hammond & Littell

[57] ABSTRACT

A process for the treatment of leafy green plants for the extraction of proteins in the pressing juices and an economic dehydration of cake.

Treatment of lucerne.

The following steps are carried out:

1. High level of juice extraction by pressing the raw material plant, resulting in a simultaneous and marked lowering in the moisture content thereof;

2. An improvement of the overall heat balance, in relation with the saving of heat obtained:

during dehydration of the pressed vegetable matter cake, during concentration of the serum by concentration in a multiple effect apparatus, 3. Maximum recovery of the proteins present in the pressing juice, with the production of a dehydrated protein concentrate usable in human nutrition and animal feeding.

Application to the economical dehydration of lucerne and recovery of proteins.

39 Claims, 6 Drawing Figures

FIGURE I
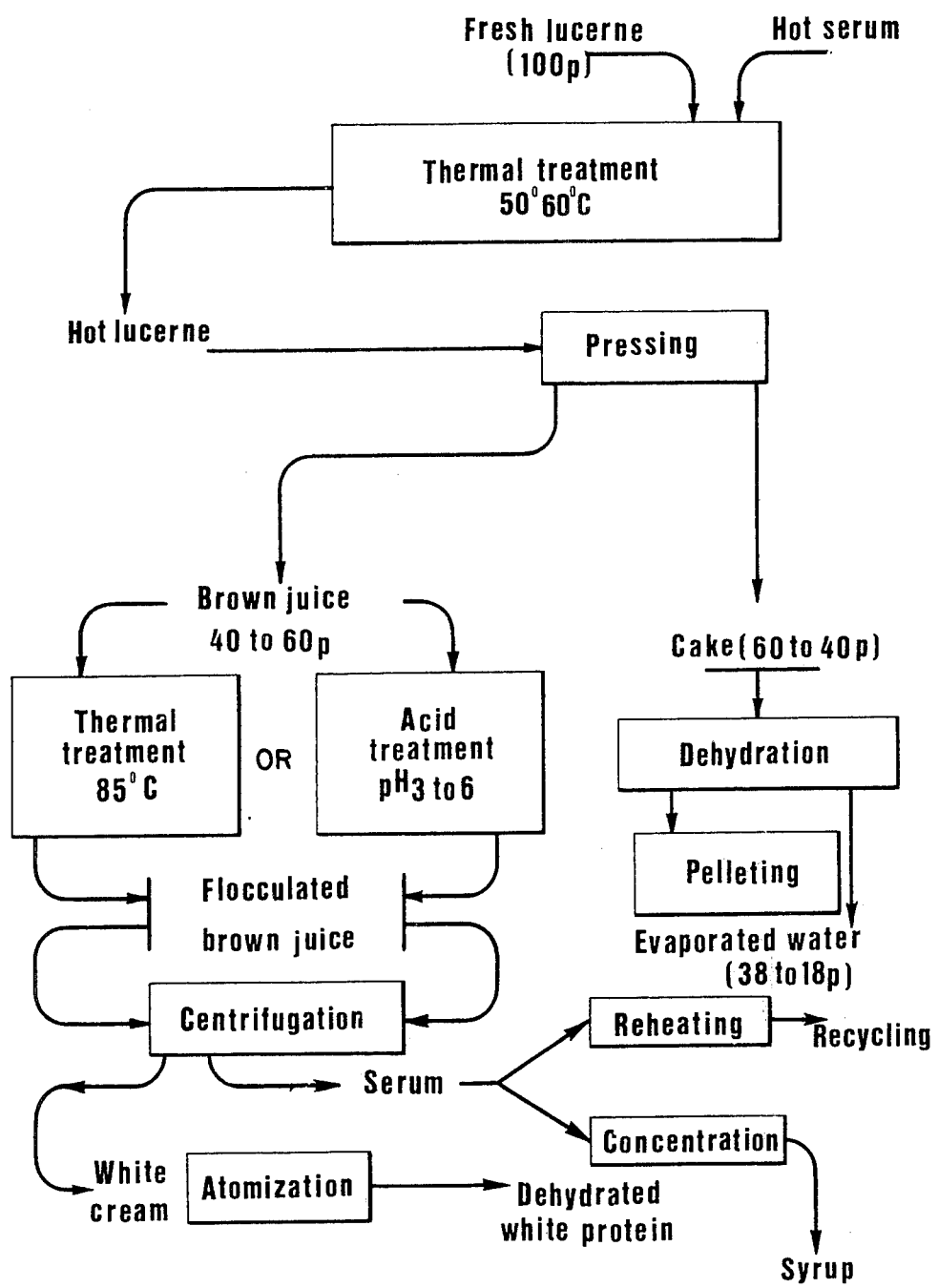

FIGURE II
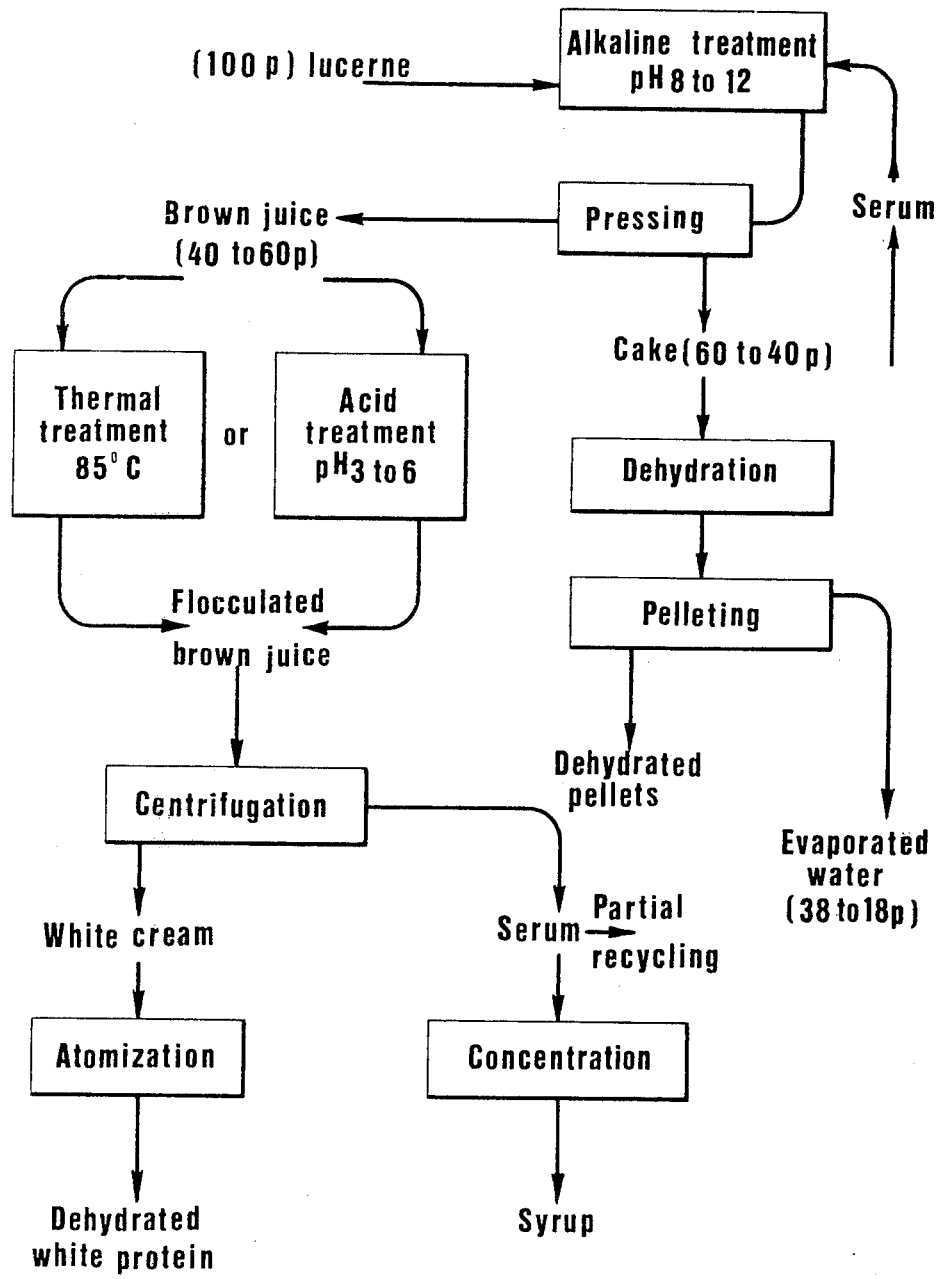

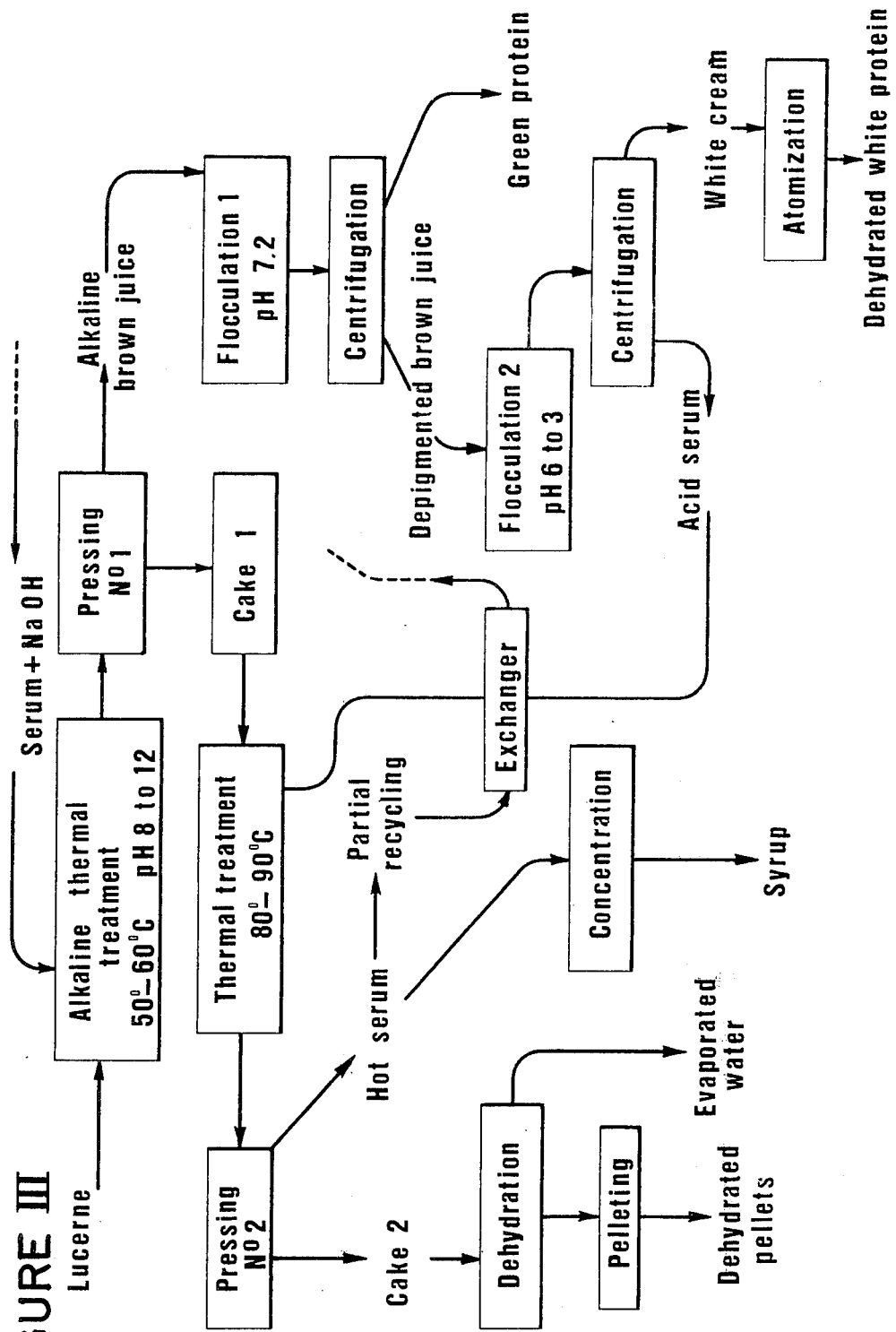
FIGURE III

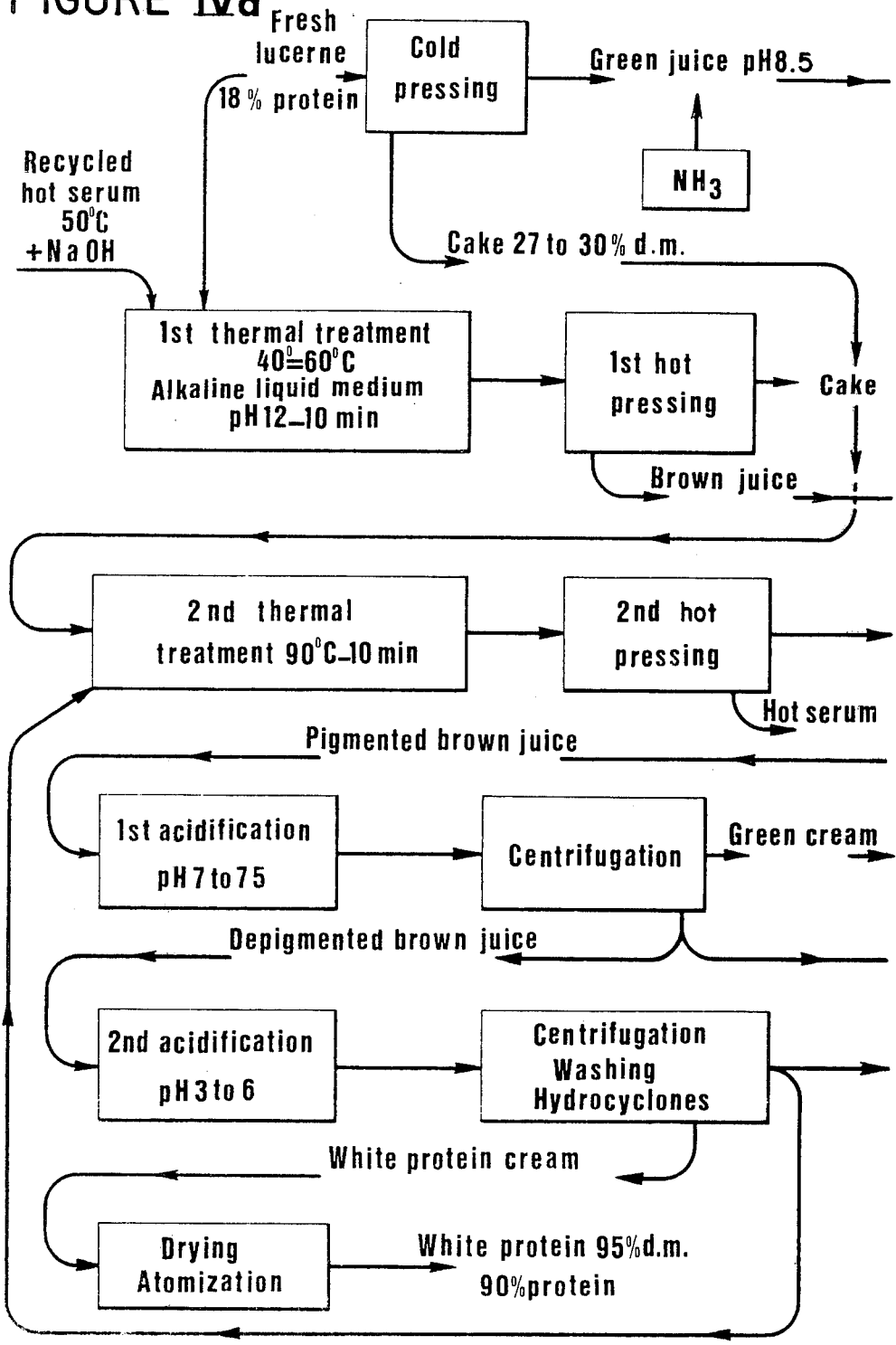
FIGURE IVa

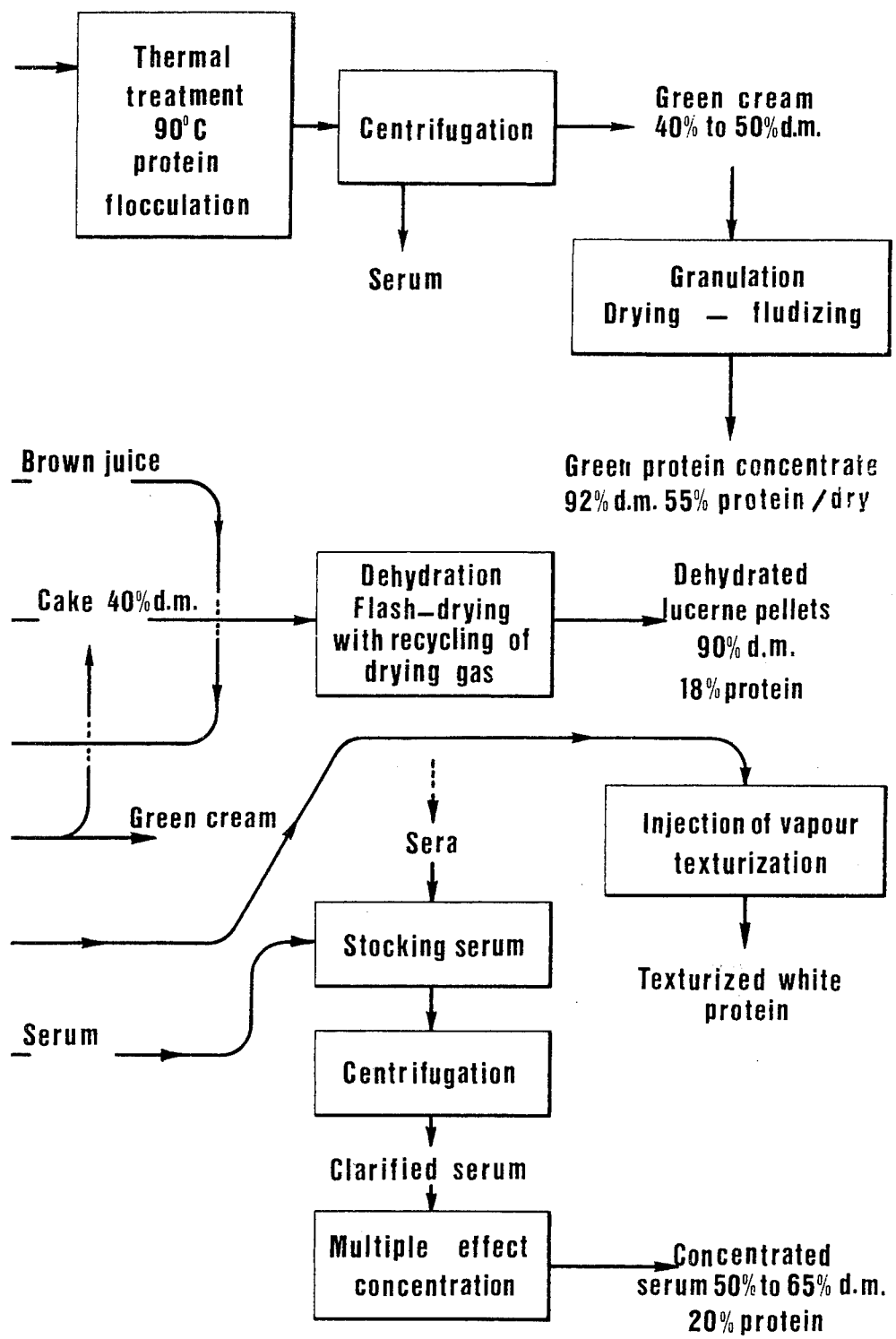
FIGURE IVb

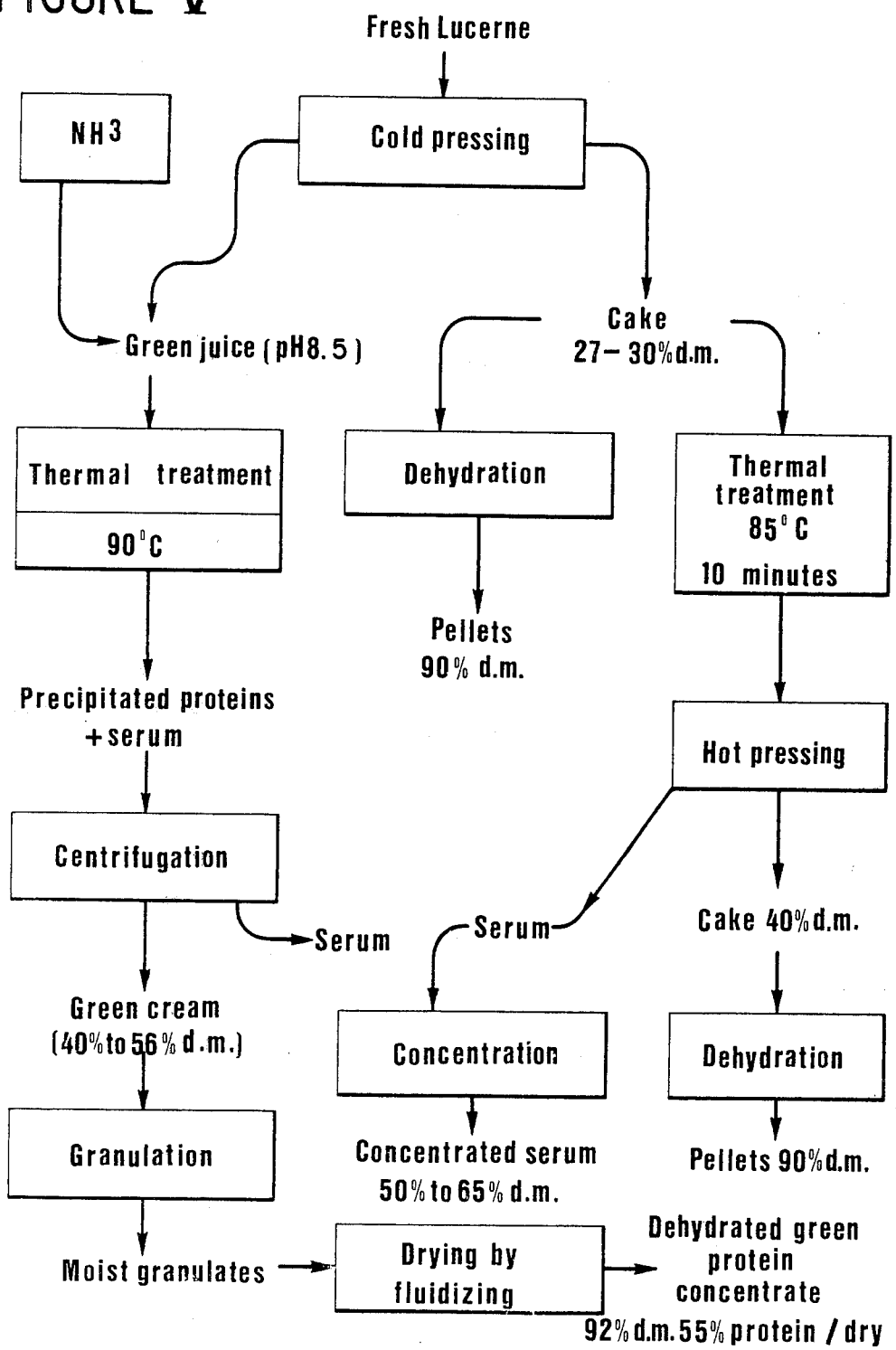
FIGURE V

PROCESS FOR THE TREATMENT OF GREEN, LEAFY PLANTS FOR THE EXTRACTION OF PROTEINS IN THE PRESSING JUICES AND FOR ECONOMICAL DEHYDRATION OF CAKE

The invention relates to the treatment of green, leafy plants, such as lucerne, in order to economize fuel when dehydrating plants and also to extract the proteins available in the pressing juices. Said proteins finding an application in animal feeding or human nutrition.

It is known that green leafy plants, notably used in animal feeding, can be subjected to treatment consisting of dehydration and conditioning making it possible to obtain a feedstuff in the form of cylindrical pellets which are easier to conserve, stock, handle and transport. These dehydrated lucerne pellets have homogenized and controlled qualitative characteristics such as, for example, definite moisture levels and protein, carotene, xanthophyll and cellulose contents. In this respect, lucerne is, in its dehydrated form, a plant particularly suited to animal feeding.

Processes are also known which enable the proteins contained in plants such as lucerne to be recovered by the physico-chemical treatment of the juice obtained after pressing the crude plant.

It is necessary to reduce as much as possible the heat consumption necessary to obtain dehydration of the plant treated for conservation thereof. Present day dehydration processes, for lucerne for instance, consume large quantities of fuel, such as fuel oil, which is a costly raw material. The present invention takes advantage of the fact that pressing plant matter makes it possible to extract a juice and obtain a pressed vegetable cake having a moisture content substantially lower than the initial moisture content of the starting material. Under these conditions, subsequent dehydration of the cake is possible under thermal conditions which are particularly advantageous from an economical standpoint. Furthermore, the pressing juice more often than not contains a high level of proteins, the possible loss of which cannot be discounted. It is therefore desirable to recover the proteins contained in said juice by any suitable technical means.

The object of the invention is, as it happens, a process for the treatment of leafy green plants, especially fresh lucerne, making it possible to simultaneously attain the following objectives:

1. Thorough extraction of juice by pressing the raw plant material, resulting in considerable simultaneous lowering of the moisture content thereof;

2. An improvement of the overall heat balance-sheet, in relation to the heat enconomized:
   during dehydration of the pressed vegetable cakes
   during concentration of the serum by evaporation in a multiple effect apparatus, 3. Maximum recovery of the proteins found in the pressing juice, with the production of a dehydrated protein concentrate usable in animal and human nutrition.

The invention therefore relates to a process for the treatment of green leafy plants, especially fresh lucerne, comprising the following steps:

a. treatment by a wet method of the crude plant material under conditions capable of causing, in a careful and controlled manner, flocculation of the proteins within the plant tissues, the plant retaining the greater part of its pigments, while the pressing juice takes away a minimal amount of pigmented proteins, the weight ratios of liquid medium to raw material being variable notably between 1:1 and 10:1;

b. pressing the material obtained in step "a" until the partial dehydration rate desired, resulting in a cake and a brown juice, the cake thus having a moisture content substantially lower than the initial moisture content of the starting vegetable matter, the weight of juice extracted by pressing being 40 to 60% of the initial weight of the fresh vegetable matter used, with separation of a cake which is thus partially dehydrated and the brown pressing juice having a certain protein content;

c. dehydration in a known manner of the cake obtained in step "b"

d. treatment of the brown juice to eliminate the pigments entrained and flocculation of the non-pigmented proteins;

e. separation of the non-pigmented flocculated protein fraction of step "d" and a liquid effluent referred to as serum.

It will be noted that the crude vegetable matter can, previous to its treatment during step "a", be subjected to mechanical disintegration, but said step is not indispensable for carrying out the requirements of the invention. It may even be preferable and more economical not to carry out this operation when putting the invention into effect, and it is further possible to envisage avoiding the shredding normally carried out at harvesting.

Step (a) can be carried out in the presence of water, but according to the most advantageous mode of embodiment of the invention, the serum recovered at the end of step "e" is partly recycled in step "a" for use as the liquid medium for moistening crude vegetable material.

The retention of pigmented proteins within plant cells and the separation of a juice containing a maximal amount of cytoplasmic proteins can be obtained by three methods:
I-The thermal way
II-The chemical way with alkalinization;
III-Combined chemical and thermal ways.

I. THE THERMAL WAY

According to the first variant of the process of the invention, the fixing in the vegetable tissues of the pigments and pigmented proteins associated therewith is obtained by thermal flocculation. In this case, it is advantageous for the recycled serum to be preheated to serve both as liquid medium and vector of calories in the mass of fresh vegetable matter. In the case of lucerne, such a thermal treatment capable of inducing the flocculation of the pigmented proteins involves a temperature of the mass in the range of 50° to 60° C under conditions of pH of between 5 and 8.5. Preheating of the serum is calculated so as to obtain a green lucerne-serum mixture having an average homogeneous temperature of 50° to 60° C during the duration of the treatment of step "a." The following are the practical conditions which gave satisfactory results:

Temperature of the fresh lucerne-serum mixture: 50° to 60° C;

Admission of serum at a rate of about 3 to 6 parts by weight for 1 part by weight of fresh lucerne;

Adjustment of the pH to a value between 4.5 and 8.5;

Time of sojourn in the mixing apparatus before pressing: 5 to 10 minutes.

II. THE CHEMICAL WAY WITH ALKALINIZATION

According to a variant of embodiment of the step of treatment "a," the crude vegetable matter, whether disintegrated or not, is treated in a strongly alkalinized liquid medium. The pH of the medium should be higher than 10, and preferably approximately 12. The most suitable reagent is sodium hydroxide. Other alkalinizing agents, such as ammonia, potassium hydroxide, calcium carbonate, calcium acetate, for example, can also be used alone or mixed with one another or with sodium hydroxide. The pigmented proteins within vegetable tissues are thus caused to flocculate.

Said technique results in a better extraction of the proteins in the juice, but, in parallel, to a lower dry matter content in the pressing cake.

In the case of lucerne, the conditions found to be suited to the embodiment of said step "a" were as follows:

Temperature of the fresh lucerne-serum mixture: 10° to 25° C,

Admission of serum at about 0.5 to 3 parts by weight for 1 part by weight of fresh lucerne;

Adjustment of the pH to a value of pH 12 by the addition of sodium hydroxide to the serum;

Time of sojourn: 10 to 20 minutes, preferably 15 minutes.

III. COMBINED CHEMICAL AND THERMAL WAYS

According to a variant of embodiment of step "a" of the treatment, the fresh vegetable matter, whether disintegrated or not, is treated by a combination of the chemical and thermal ways described hereinabove. Optimalization of the following yields is thus obtained.

High extraction yield of cytoplasmic protein in the pressing juice, following a first treatment by the alkaline chemical way;

High yield at pressing, resulting in a high dry matter content in the pressing cake intended to be dehydrated.

In its application to lucerne, the process is characterized by the following steps:

1. Treatment of fresh lucerne in an alkalin liquid medium at pH 12, maintained at a moderate temperature in the range of 40° to 60° C for 10 to 20 minutes. Generally, 2 to 6 parts by weight of serum are used for 1 part by weight of fresh lucerne. At this stage there is obtained a solubilization of the cytoplasmic proteins in the juice and, in parallel, a flocculation of the pigmented proteins within the vegetable tissues.

2. Pressing of the lucerne treated in the preceeding step. Said pressing effected with heat, making it possible to separate a brown juice on the one hand and a pressed lucerne cake on the other.

3. Second treatment of the lucerne by mixing cake no1 in a liquid medium at a temperature of approximately 85° C for 10 to 20 minutes. Generally speaking, 2 to 6 parts by weight of serum are used for 1 part by weight of cake.

4. Pressing the cake heated to 85° C in the preceeding step, resulting in a cake no2, and a serum. Cake no2 has a high dry matter content in the range of 35% to 50%.

5. Dehydration of cake no2 in rotating drum dryer using the conventional technique. The low relative humidity of the cake (65% to 50%) may result in a lowering of the inlet temperature of the dryer from 900° to 700° C or 600° C. Under these thermal conditions, recycling the cyclone gases of the dryer makes it possible to obtain a thermal economy of approximately 8 to 10%. A dehydrated lucerne flour is obtained which could be agglomerated in a press to produce pellets.

6. Treatment of the brown juice obtained after a first low temperature (40° to 60° C) pressing. Said brown juice has a high precipitable protein content, a small portion of which is pigmented green. Said pigmented proteins are separated by a first acidification, adjusting the pH of the brown juice to a pH of 7.0 to 7.5. Separate flocculation of proteins from the small amount of pigmented proteins is thus brought about. Centrifugal separation is then effected in order to obtain, on the one hand, a green cream and, on the other, a liquid effluent containing the non-pigmented proteins or "white proteins", said liquid effluent being referred to as the depigmented brown juice. The green cream is mixed with pressing cake no2 before dehydration thereof.

7. Treatment of the depigmented brown juice to separate the white proteins contained therein. Flocculation of white proteins may be carried out either by the thermal way (70° to 95° C, notably at 85° C), or by the acid way (addition of an acid agent). In the case of a treatment by the acid way, the pH of the brown juice is adjusted to a value of between pH 3 and pH 6, by the addition of hydrochloric acid or any other acid (sulphuric acid, trichloroacetic acid).

8. Separation by centrifugation of a white cream on the one hand and a serum on the other.

9. Purification of the white protein cream by methodical washing with water or alcohol (ethanol) or by means of an alcoholic solution by counter-flow circulation of the washing liquid and the white cream in a series of centrifuge separators or hydrocyclones. A very pure white protein cream is thus obtained, containing 85 to 95% of proteins based on the dry matter.

10. Drying the white protein cream by atomization or spray-drying, resulting in a pulverulent white protein concentrate having a moisture content in the range of 5 to 8%.

11. Treatment of the sera obtained in the various steps of the process no2, pressing serum, centrifugation serum, after the second acidification to pH 3 to 5. Said collected sera are subjected to centrifugal separation by which the liquid is clarified. The clarified serum is introduced into a multiple effect concentration apparatus, making it possible to obtain a concentrated serum having a dry matter content in the range of 50% to 65%. Furthermore, a portion of the clarified serum is introduced into a heat exchanger to provide both the liquid volume and the calories necessary for the two thermal treatments of green lucerne before each of pressings no1 and No2. The heat exchanger or exchangers may comprise either a vapor inlet or an inlet for juice or serum at high temperature supplied from various points of the diagram, in order to recover the calories.

From another point of view, the invention also has as its object a process for the treatment of leafy vegetable matter, and notably of lucerne, in order to recover a green protein concentrate, characterized by the steps of a'. cold pressing fresh vegetable matter, thus obtaining a green juice and a cake;

b'. treatment of the green juice, by alkalinization to a pH of approximately 8.5, for example with ammonia;

c'. flocculation of the proteins in the green juice by thermal treatment, this step providing a protein precipitate and a serum;

d'. centrifugation of a precipitated protein-serum mixture until there is obtained a green cream comprising 40 to 50% or more of dry matter;

e'. conditioning the green cream, in the form of pellets, followed by drying, which provides a dehydrated green protein concentrate.

Said latter process can also comprise additional steps of treatment of the cake obtained in step "a" with dehydration by conventional means to obtain dehydrated pellets or, according to an advantageous characteristic of the invention, with thermal treatment of the remainder of the cake, for example at 85° C for 10 minutes. The thermally treated cake can then be subjected to hot pressing providing, on the one hand a serum, which can be concentrated and, on the other, another cake which can be dehydrated to provide other pellets.

According to a particularly advantageous form of embodiment, the process described under III makes it possible to integrate cold pressing at the head of the diagram in an advantageous manner to obtain a green juice with a high protein content. The process is then carried out as follows:

A. Cold pressing fresh lucerne; elaboration of a green juice with a high protein content and a cake having a relatively low dry matter content (27% to 30%).

B. Treatment of the cake by admission at stage no3 described hereinabove corresponding to a thermal treatment at 85° C in a liquid medium. The cake, introduced into the process previously described at this point of the diagram, is subsequently subjected to the steps which have already been described above.

C. Treatment of the green juice for the flocculation of all the pigmented and cytoplasmic proteins contained in said juice;

1. Alkalinization of the juice to a level of pH 8.5 by the injection of ammonia;
2. Thermal flocculation by raising the temperature of the juice to 85° to 90° C by the use either of a vapour injector or a heat exchanger;
3. Centrifugal separation, for example on a horizontal axis centrifuge superdecanter of the type AVNX 418 ALFA-LAVAL, providing a green cream having a dry matter content higher than 40% and which may be higher than 50%, and reach 56%, the last value having been attained during practical trials. There occurs a separation of a liquid effluent, or serum, which will be subjected to the treatment described below for concentration;
4. Granulation of said high dry matter content green cream to obtain pellets of $\phi$ 2 to 4 mm intended to supply the dryer-fluidizer apparatus. An antioxidant may be incorporated in a known way in the granulation step to protect the pigments (xanthophylls, carotene, etc...).
5. Drying green cream pellets by hot air fluidization to obtain a green protein concentrate in the form of dehydrated pellets having a dry matter content of 92% and a protein content of approximately 55% on dry.

The whole process integrating cold pressing, makes it possible to obtain at will the following results:

1. Partial dehumidification of fresh lucerne by simultaneous mechanical and thermal ways, to obtain a maximum economy of energy during dehydration of fodder and the production of dehydrated lucerne;
2. Production of green protein concentrate comprising 55% protein;
3. Production of white protein concentrate comprising 85 to 95% protein on dry;
4. Production of concentrated serum comprising 50 to 65% dry matter and 20% protein on dry;
5. Production of dehydrated lucerne pellets.

TREATMENT OF THE BROWN JUICE OBTAINED BY ANY OF THE VARIANTS DESCRIBED ABOVE

After step "a," the vegetable matter having been subjected to a thermal and/or alkaline treatment by which the pigmented proteins have flocculated within vegetable tissues, is introduced into a press by which it is possible to extract a brown juice and obtain a partially dehydrated cake.

In the advantageous form of embodiment, the liquid-solid mixture (serum-vegetable matter) treated in step "a" is subjected to pressing.

In the case of lucerne, for example, there is obtained a cake having a weight of 60% to 40% by weight of the fresh lucerne used. Said cake having a dry matter content in the range of 35% to 50% based on the initial moisture of the fresh lucerne.

a brown juice the weight of which is 40% to 60% by weight of the fresh lucerne used. Said juice has a dry matter content in the order of 5% to 10%. The process by the thermal way is characterized particularly by obtaining a high dry matter content in the cake, which may be as high as 50%.

The process by the chemical way with alkalinisation makes it possible to obtain a relatively high dry matter content in the cake a substantially higher level of precipitable proteins in the pressing juice than that obtained by ordinary pressing. Moreover, the precipitable proteins consist of cytoplasmic proteins which amount to 150% by weight of the precipitable proteins obtained in the juice by conventional pressing.

During step "c", the cake is dehydrated by traditional means. Thus, when dried, the lucerne cake provides a dehydrated lucerne flour which is then agglomerated in a press into pellets by known means. The low relative moisture of the cake (65% to 50%) may result in a lowering of the temperature at the dryer inlet from 900° C to 700° C or 600° C. Under these thermal conditions recycling the cyclone gases of the dryer permits a thermal saving in the order of 8 to 10%.

In step "d", the brown juice is subjected to a treatment capable of inducing flocculation of the cytoplasmic proteins. Said flocculation can be obtained by the thermal way or by the addition of an acid agent.

In the case of lucerne, heating the brown juice to a temperature in the range of 70° to 95° C, and notably 85° C, makes it possible to induce flocculation.

In the case of a treatment by the acid way, hydrochloric acid, or any other acid capable of adjusting the pH of the brown juice to a value of 3 to 6 may be used.

As an acid agent, any compound or mixtures of compounds capable of providing a pH of 3 to 6 in the brown juice may be used. It may be an organic or inorganic acid, and among the most usual acids, hydrochloric, sulphuric or trichloroacetic acid may be mentioned.

The precipitated cytoplasmic proteins are then separated; a centrifugal separation is, for example, used; a first product is thus obtained containing the cytoplasmic proteins and a liquid effluent referred to as serum. In the case of lucerne, notably, a white cream is obtained having a dry matter content in the range of 12 to 20%. The said protein cream is subsequently treated by the conventional means to dehydrate it. In the case of lucerne, a white protein powder can thus be obtained having a dry matter content of about 92%. Said white protein concentrate can be used in animal or human nutrition.

The liquid effluent or serum is partially recycled to step "a" of the process; in the case of this implying an alkaline treatment, the serum is recycled at a suitable temperature.

The amount of serum recycled is solely a function of the calorific or chemical requirements of step "a".

However, in the case of a relatively high initial moisture of the fresh lucerne, the serum recycling coefficient can be limited by directly supplying calories in step (a), for example by immersing a heating coil in the reaction mixture.

The serum quantity which is not recycled can be concentrated to a syrup having, for example, a dry matter content in the order of 50 to 65%. Said syrup can also be used; for example, in the case of lucerne, said syrup can either be mixed with the moist cake prior to dehydration of the latter, or mixed with the dehydrated lucerne flour before the pelleting operation consisting of forming pellets by agglomeration in a press.

Technically speaking, the process of the invention can be put into effect in known devices.

As an example, treatment in step "a" can be effected in a whitener type apparatus. In step "b", the moist mass obtained from the apparatus of treatment "a" is advantageously introduced into a high yield continuous press of the screw or conical wheel type. Notably, screw presses of the type STORD are used, or those known as "WHEEL PRESSES", such as those constructed by the firms "DAVENPORT PRESS" and "RIETZ".

Conventional apparatus are used for the other types of treatment, notably for the dehydration of lucerne and the recovery of proteins from the various liquid fractions obtained during treatment. Variants I, II and III, previously defined, will now be illustrated in greater detail with reference respectively to FIGS. I-V, which are appended to the end of the present description and are basic diagrams for the corresponding processes.

As shown in FIG. I, illustrating the thermal way, fresh lucerne, for example at a rate of 100 parts by weight, is introduced into the thermal treatment apparatus jointly with hot serum in an amount of 300 parts by weight, and at a temperature such that the temperature of the mass in the apparatus is in the range of 50° to 60° C. The hot lucerne leaving the apparatus is then subjected to pressing, providing a brown juice (40 to 60 parts by weight) and a cake (60 to 40 parts by weight). The cake is consecutively dehydrated, then converted into pellets in a press in a conventional manner. The water evaporated during dehydration amounts to 18 to 38 parts by weight. A man skilled in the art will immediatly understand that the process of the invention involves a reduction in heating requirements, taking into account the limited thermal requirements associated with serum concentration, drying of the protein concentrates and, optionally, the thermal treatment before pressing.

As a comparison, a traditional treatment for lucerne dehydration provides, starting with 100 parts by weight of fresh lucerne of about 80% mean moisture, 22 parts of pellets and consequently 78 parts of evaporated water. The process of the invention only provides from 18 to 38 parts of evaporated water. To be sure, the serum has subsequently to be concentrated as will be seen below, but said operation intended to provide a syrup can easily be effected in a multiple effect apparatus with a very high heat yield.

The brown juice obtained from pressing (40 to 60 parts) is subjected to thermal treatment (reheating to 85° C) or to an acid treatment adjusting it to pH 3 to 6, for example by the addition of hydrochloric acid. A flocculated brown juice is thus obtained and subjected to centrifugation. Said last step provides a white protein cream, which is atomized in the conventional manner to provide a final product consisting of a dehydrated white protein. Centrifugation also permits a serum to be separated out, a portion of which is reheated and recycled in the thermal treatment apparatus, while the remainder is concentrated to a syrup usable as it is or as an additive during dehydration of the cake or the formation of pellets from the dehydrated lucerne flour. In the chemical variant with alcalinization shown in FIG. II, the fresh lucerne, for example at a rate of 100 parts by weight, is subjected to a treatment under alkaline pH conditions between 8 and 12 by an addition of sodium hydroxide in the presence of a certain amount of recycled serum (for example 300 parts). The alkaline agent can be introduced directly into the treatment apparatus or be previously mixed with the recycled serum. The alkalinized lucerne, mixed with the serum, is then subjected to pressing, resulting in a cake (60 to 40 parts) already partially dehydrated, and a brown juice (40 to 60 parts). The cake is then subjected to the conventional operation of dehydration which makes it possible to obtain a dehydrated lucerne flour which is converted into pellets and an amount of evaporated water (18 to 38 parts) very much smaller than that of the conventional process. In another connection, the brown juice (40 to 60 parts) is subjected to thermal treatment by heating at 85° C or to an acid treatment (the addition of hydrochloric acid for example) adjusting it to a pH of 3 to 6. The flocculated brown juice thus obtained is subjected to centrifugation which, on the one hand, provides a white cream which, after atomization, gives a dehydrated white protein and, on the other, a serum. The serum is partially recycled to the alkaline treatment step and an amount corresponding to the requirements thereof, and the residual amount of serum is concentrated to a syrup which is usable in the manner previously described with reference to FIG. I. With reference to FIG. III, a variant of the process will now be described, wherein a thermal treatment and an alkaline treatment of fresh lucerne are realized simultaneously. The fresh lucerne is subjected to such a combined treatment under temperature conditions in the range of 50° to 60° C and a pH between 8 and 12. With this in view, the recycled serum was previously recycled and an alkaline agent such as sodium hydroxide is added. The lucerne so treated is then subjected to a pressing step (pressing no1) providing an alkaline brown juice and a first cake (cake 1). Cake 1 is then subjected to thermal treatment at 80°-90° C. and a hot acid serum obtained in the manner described hereinafter is simultaneously added. Cake no1 is then subjected to a second pressing (cake no2), which is dehydrated and converted into pellets in a known manner, and a hot serum, which is partially recycled after having passed through an exchanger and having had sodium hydroxide added thereto, while the residual amount is concentrated and provides a syrup usable as previously described.

The brown juice obtained from pressing no1 is submitted to a first flocculation(flocculation no1) at pH 7.2 The flocculated juice is then subjected to centrifugation resulting in a green protein (usable for example for animal feeding) and a depigmented brown juice. The latter is then subjected to a second flocculation step (flocculation no2) at pH 3 to 6. The product leaving this step is subjected to a further centrifugation which provides an acid serum which is introduced, through the aforesaid exchanger, into the thermal treatment step. The centrifugation finally providing a white protein cream which, after atomization, gives a dehydrate white protein. It will be noted that the green protein can either be recovered or recycled on the cake before pressing no2, this is favourable as said pressing can thus be effected under acid pH conditions.

The variant according to which the process of the invention is carried out by combined thermal and chemical ways will now be illustrated with reference to FIG. IV which, for convenience sake is separated into two FIGS., IVa and IVb. FIGS. IVa and IVb together show the general diagram of the process and illustrate the circulation of the materials. According to the invention, the fresh lucerne, containing for example 18% protein, is subjected to a first thermal treatment at a mean temperature of 40° to 60° C in a strongly alkaline liquid medium (pH about 12), the time of sojourn in the reactor being about 10 minutes. The reaction medium is a hot recycled serum (mean temperature 50°) with sodium hydroxide added. The moist mixture obtained from the thermal treatment is then subjected to a first hot pressing providing, on the one hand, a brown pigmented juice and, on the other hand, a cake. The cake is then subjected to a second thermal treatment (the conditions of said treatment are, for example, temperature 90° C, duration 10 minutes). To facilitate calory transfer, the cake can, at this stage of treatment, have added to it a small amount of a serum obtained from a subsequent step as will be described below. After said second thermal treatment, the cake is subjected to a second hot pressing making it possible to obtain essentially a cake containing, for example, 40% dry matter. Said cake can, in a known manner, be dehydrated in a flash-drying installation, advantageously with recycling of the drying gases to improve the heat balance. Dehydrated lucerne is thus obtained, which can be converted into pellets in the conventional manner. These will, for example, have a protein content of 18%. The hot serum resulting from the second pressing is sent for serum stocking.

The alkaline pigmented brown juice resulting from the first pressing has an acid, such as hydrochloric acid, added thereto until a pH of 7 to 7.5 is obtained. A subsequent centrifugation providing a green cream, a portion of which can be recovered and the other portion can be added to the cake obtained after the second pressing. Said green cream constitutes another valuable product capable of being produced by the process. During centrifugation, the green cream is separated from a depigmented brown juice which is also a very valuable product. It can, in part, be treated by steam injection for the texturization of proteins, this making it possible to obtain a texturized white protein directly applicable in human nutrition.

The residual amount of depigmented brown juice is subjected to a treatment under acid conditions involving a pH of 3 to 6. Hydrochloric acid can be added to the depigmented brown juice for this purpose.

The product is then centrifuged simultaneously with methodical washing (with counter-current) with water and/or alcohol, or aqueous sodium hydroxide. A very pure white protein cream is thus obtained which can be dried by atomization to provide a white protein containing, for example, 95% dry matter and 90% protein, thus constituting a valuable product for human and animal nutrition.

Part of the serum separated by centrifuging may be stocked and a part be recycled to the second thermal treatment of the cake.

The various fractions of serum obtained during the process are stocked. Centrifuging provides a clarified serum which can be clarified in a multiple effect apparatus to provide a concentrated serum containing, for example, 50 to 65% dry matter and 20% protein.

The process illustrated with reference to FIGS. IVa and IVb is advantageously put into effect as an integrated process including a production of concentrated green protein. For clarity in the description, the manufacture of lucerne concentrate has been shown separately in FIG. V. As is shown in the table, the fresh lucerne is subjected to cold pressing in the conventional manner providing, on the one hand, a green juice, and, on the other, a cake containing 27 to 30% dry matter. Part of the cake may be dehydrated and converted into pellets containing 90% dry matter. The cake is essentially subjected to a thermal treatment, for example at 85°–90° C for 10 minutes, after which hot pressing provides, on the one hand, a cake containing, for example, 40% dry matter which can provide, after dehydration, pellets containing 90% dry matter, and, on the other, a serum which, by concentration, gives a concentrated syrup containing 50–65% dry matter.

The green juice obtained from cold pressing is first treated with ammonia, to a pH of 8 to 8.5. The juice so alkalinized is then subjected to thermal treatment to flocculate the proteins, for example at a temperature of 90° C. Thus, after the thermal treatment, a protein precipitate and a serum are obtained which can be separated by centrifugation. The invention advantageously makes use of a centrifuger device known as a super-decanter, manufactured by the firm ALFA-LAVAL and put on the market under the number AVNX 418. The performances of this apparatus make it possible to obtain directly a green cream containing 40 to 65% dry matter. Granulation provides moist granules which can be dried by fluidization, resulting in a final dehydrated green protein concentrate containing 92% dry extract and 55% protein (based on the dry extract).

As was noted hereinabove, the production of green protein concentrate, as it has just been illustrated with reference to FIG. V, may advantageously be integrated in the combined process as illustrated in tables FIGS. IVa and IVb.

As can be seen in the upper part of FIGS. IVa and IVb, the fresh lucerne can partly be subjected to the combined thermal and chemical treatment and partly to cold pressing. This provides a cake having a dry matter content of 22 to 30%, which can be put with the cake obtained from the first hot pressing to undergo the subsequent steps of the process. The green juice being treated in the manner illustrated in FIG. V, by the addition of ammonia to a pH of 8.0–8.5, thermal treatment at 90° C, followed by protein flocculation and high centrifugation, for example in the ALFA LAVAL AVNX 418 super-decanter previously defined. The centrifugation serum can be sent into stock to be added to the other sera of the process. The green cream, containing 40 to 65% dry matter, is granulated, then dried by fluidizing to provide a green protein concentrate containing 92% dry extract and 55% protein (based on the dry extract).

The process illustrated in FIG. IV provides a certain number of particularly appreciable advantages which can be defined as follows:

1. POLYVALENCE OF THE PROCESS

The process makes it possible to carry out simultaneously the following different productions:

a. A green protein concentrate containing 55% protein adapted to animal (or human) nutrition;

b. A white protein containing 85 to 95% protein adapted to human nutrition;

c. A concentrated serum containing 50 to 65% dry matter adapted to animal feeding;

d. Dehydrated lucerne pellets containing 16 to 22% protein.

2. FLEXIBILITY AND POSSIBILITY OF ADAPTATION of the process to the various different requirements of the market. It is possible, at will, to develop one or other of the following production ranges to the extent required: green protein concentrate, white protein, concentrated serum, dehydrated lucerne pellets. Cold pressing provides a low-protein cake which can be put to specific uses. Hot pressing, on the other hand, provides a cake with a much higher protein and carotenoid content based on the dry matter than the initial lucerne, and with a very low level of mineral materials and other secondary substances.

3. The possibility of obtaining two types of white protein.

a. By the acid way: Treatment of the depigmented brown juice at a pH of between pH 3 and pH6 makes it possible to obtain soluble proteins, capable of subsequent texturization;

b. By the thermal way: treatment of the depigmented brown juice by steam injection under predetermined conditions of velocity of juice flow, steam flow and pressure (in a specially adapted steam injector), making it possible to obtain direct TEXTURIZATION of the white protein.

4. The process makes possible a substantial saving of thermal energy used for dehydration of fodder. Compared with a green lucerne containing 20% dry matter, a pressed lucerne cake, containing 40% dry matter makes it possible to economize more than 50% evaporation energy. Moreover, said saving in energy can be increased by carrying out partial recycling of the drying gases.

5. Complementarity of the techniques used.

Examination of the diagram shows the complementary exchanges occurring either in material or calories, between the various technical steps of the process.

6. TECHNOLOGICAL UNITY AND COHERENCE OF THE process, in relation to the technical advantages and operational complementarity mentioned above.

EXAMPLE 1

This example illustrates the thermal way (see FIG. I). 600 kg of hot serum is added to 100 kg of lucerne comprising 20% dry matter and titering 18–55% of protein on dry matter so that the lucerne-serum mixture is at 55° C. The mixture is maintained at this temperature for 8 minutes, the pH of the serum being 5.7.

The hot lucerne is pressed after draining. There is obtained, on the one hand, 41.500 kg cake containing 40.75% dry matter titering 18.8% protein on dry matter and, on the other, 88kg of a brown pressing juice containing 6.70% dry matter titering 18.90% total nitrogenous matter, including 2.7% precipitable proteins, and 570 kg of a draining juice containing 6.20% dry matter titering 18% total nitrogenous matter including 0.37% precipitable proteins.

The pressing and draining juices are mixed and treated at 85° C, or acidified at pH 3.5 by hydrochloric acid and centrifuged.

1.940 kg of white cream is obtained which, when atomized, provides 426g of a white protein powder containing 90% dry matter and titering 75% total nitrogenous matter on dry matter. Furthermore, 600 kg of the centrifugation effluent is recycled onto the fresh green lucerne and the remaining 58 kg is concentrated giving a syrup comprising 50% dry matter. The cake is dehydrated and there is obtained 19 kg of pellets with 11% moisture content. 22.5 kg of evaporated water is found in the dryer.

EXAMPLE 2

This example illustrates the chemical way with alkalinization (FIG. II).

300 kg of serum adjusted to pH 12 by sodium hydroxide is added to 100 kg of green lucerne containing 17.20% dry matter and titering 19.35% total proteins on dry matter.

The mixture is maintained for 15 minutes.

The lucerne is then drained and pressed. There is obtained, on the one hand, 50.7 kg of cake containing 29.10% dry matter titering 15.20% total proteins on dry matter and, on the other, 87.50 kg of a brown pressing juice comprising 7.38% dry matter titering 14.05% total nitrogenous matter on dry matter, including 5.25% precipitable proteins, and 257 kg of a brown draining juice containing 5.3% dry matter titering 13.3% of total nitrogenous matter on dry matter, including 2.70% precipitable proteins. The pressing and draining juices are mixed and acidified to pH 4.5 by the addition of hydrochloric acid and then centrifuged 4.710 kg of white cream is obtained which, when atomized, provides 1.046 g of white protein powder comprising 90% dry matter and titering 75% total nitrogenous matter on dry matter.

Furthermore, 300kg of centrifugation effluent is recycled onto fresh green lucerne after the pH has been adjusted, and the remaining 44 kg is concentrated to obtain a syrup comprising 50% dry matter.

The cake is dehydrated to provide 16.5 kg of pellets with an 11% moisture content.

34.2 kg of evaporated water remained in the dryer.

EXAMPLE 3

This example illustrates the combination of chemical and thermal ways (FIGS. IVa and IVb).

300 kg of serum adjusted to pH 12 with sodium hydroxide and heated to 50° C is added to 100 kg green lucerne comprising 13.8% dry matter and titering 30.10% total proteins on dry matter.

The mixture is maintained at said temperature for 15 minutes.

The lucerne is then drained and pressed.

There is obtained, on the one hand, 53.5 kg of cake no1 comprising 23.25% dry matter titering 29.15% total proteins on dry matter and, on the other, 85 kg of a pressing juice comprising 4.7% dry matter and titering 18.05% total proteins, including 6.05% precipitable proteins, and 255.5kg of a draining juice comprising 4.7% dry matter comprising 14.45% total proteins.

The juices are mixed and acidified to pH 7.2 by the addition of hydrochloric acid and centrifuged.

1.852 kg of a green cream comprising 18% dry matter titering 30% total proteins.

The 337 kg centrifugation effluent is acidified by the addition of hydrochloric acid to pH 4.5 and centrifuged.

1.264 kg of a white cream was obtained comprising 20% dry matter which, when atomized, provided 278 g of a white protein powder comprising 90% dry matter titering 72% total proteins on dry matter.

334 kg of the serum is raised to a temperature of 95° C and recycled with the 53.5 kg of cake no1 previously obtained. The serum-cake no1 mixture is maintained at 80°–90° C for 15 minutes.

After draining and pressing, there is obtained 36.7kg of a cake no2 comprising 30.0% dry matter and titering 30.4% of total proteins which, when dehydrated, provide 12.4 kg of pellets with 11% moisture. 300 kg of serum no2 is reintroduced into the green lucerne, after the pH has been adjusted to pH 12. The remainder, amounting to 40 kg, is concentrated to 50% dry matter. 24.3 kg of evaporated water is found in the dryer.

The green vegetable material referred to in the present specification as "lucerne" is also commonly known by the man skilled in the art by the term "alfa-alfa".

What we claimed is:

1. In a process for treating green vegetable matter comprising the steps of:
   a. preliminary treatment of the crude vegetable matter,
   b. pressing the matter obtained in said step (a), thus providing a cake and a brown colored pressing juice,
   c. dehydration of the cake obtained in said step (b), the improvement being that said treatment (a) is effected under conditions capable of producing flocculation of the chloroplastic proteins within the vegetable tissues, said conditions being selected from the group consisting of (i) treating said vegetable matter at a moderately high temperature at a pH of 4.5 to 8.5, (ii) treating said vegetable matter at a pH higher than 10, and (iii) treating said vegetable matter at a moderately high temperature and at a pH of approximately 12, said vegetable matter thereby retaining within its cells the greater portion of the chloroplastic proteins and pigments, while the pressing juice entrains a maximum amount of non-pigmented cytoplasmic proteins, and that said brown colored pressing juice obtained from said step (b) is subjected to an acid or thermal treatment (d) capable of inducing flocculation of the cytoplasmic proteins and removal of the entrained pigments, and after said step (d), there is effected a separation (e) of the precipitated cytoplasmic proteins of said step (d) and a liquid serum; and further said treatment (a) is effected in a liquid medium, selected from the group consisting of water and said liquid serum recovered from said step (e), the ratio of the weight of said liquid medium to said crude vegetable matter being between 1:1 and 10:1.

2. A process according to claim 1 wherein the crude vegetable matter is treated directly in step (a) without previously being subjected to a mechanical disintegration.

3. A process according to claim 1 wherein the serum recovered at the end of step "e" is partly recycled in step "a" as liquid medium for moistening the crude vegetable matter.

4. A process according to claim 1 wherein, during step "a", flocculation of the pigmented proteins within the vegetable tissues is effected by treating said vegetable matter at a temperature of about 50° to 60° C and at a pH of 4.5 to 8.5.

5. A process according to claim 4 wherein, the serum separated out in step "e" is at least partly preheated and recycled to step "a" to serve both as the liquid medium and vector of calories in the mass of fresh vegetable matter.

6. A process according to claim 5, wherein the green vegetable matter is lucerne.

7. A process according to claim 6, wherein the serum is reheated to between 90° and 100° C before recycling to step "a".

8. A process according to claim 7 wherein the conditions of treatment in step "a" are as follows:
   temperature of the fresh lucerne-serum mixture; 50° to 60° C,
   admission of serum at a rate of about 3 to 6 parts by weight for 1 part by weight of fresh lucerne;
   adjusting the pH to a value of between about 4.5 and 8.5;
   time of sojourn : 5 to 10 minutes.

9. A process according to claim 1 wherein, during step "a", the fresh vegetable matter is treated by an alkaline agent at a temperature of about 10° to 25° C and at a pH higher than 10.

10. A process according to claim 9, wherein the alkaline agent is sodium hydroxide, potassium hydroxide, ammonia, calcium carbonate, calcium acetate or any mixtures of such compounds.

11. A process according to claim 10, wherein the alkaline agent is added to the serum before it is recycled to step "a".

12. A process according to claim 11, wherein lucerne is treated and the conditions of treatment of step "a" are as follows:
   temperature of the fresh lucerne-serum mixture: 10° to 25° C;
   admission of serum at a rate of about 0.5 to 3 parts by weight for 1 part by weight of fresh lucerne;
   adjustment of the pH to a value of 12 by the addition of sodium hydroxide to the serum;
   time of sojourn :10 to 20 minutes.

13. A process according to claim 1, wherein during step "a", the fresh vegetable matter is treated by an alkaline agent at about pH 12, and at a temperature in the range of 40° to 60° C, said combined treatment inducing flocculation of the pigmented proteins within the vegetable tissues and a solubilization of the cytoplasmic proteins in the juice.

14. A process according to claim 13, wherein the alkaline agent is added to the reheated serum prior to the recycling thereof to step "a".

15. A process according to claim 14, wherein lucerne is treated and step "a" is effected under the following conditions:
   Adjusting the pH to a value of about 12 by the addition of sodium hydroxide or alkalinized serum;
   Temperature of the fresh lucerne-serum mixture: 40° to 60° C;
   Admission of about 2 to 6 parts by weight of serum for 1 part by weight of fresh lucerne;
   Time of sojourn :10 to 20 minutes.

16. A process according to claim 15, wherein the matter obtained in the combined thermal and alkaline treatment is subjected to a first pressing (step "b"), which provides an alkaline, pigmented brown juice, and the pH of said juice is adjusted to a value of about pH 7 to 7.5 by the addition of an acid, inducing flocculation of the pigmented proteins which may have been entrained and permitting separation thereof into a green protein cream and a depigmented brown juice containing the cytoplasmic proteins.

17. A process according to claim 16, wherein the first cake obtained from pressing step "b" is subjected to a thermal treatment in an acid medium at between 80 and 90° C prior to being subjected to a second pressing providing a second cake capable of being dehydrated in a conventional manner and a serum.

18. A process according to claim 17, wherein the depigmented brown juice is subjected to flocculation by acid treatment at pH 3 to 6, this providing an acid medium to be sent to the thermal treatment step provided between the two pressings.

19. A process according to claim 18, wherein the green protein cream is recovered, or recycled to the cake obtained during the second pressing, before dehydration thereof.

20. A process of claim 1 wherein the green vegetable matter is lucerne and said treatment (a) is effected under conditions selected from the group consisting of (i) treating said vegetable matter at a temperature of about 50° to 60° C and at a pH of 4.5 to 8.5, (ii) treating said vegetable matter at a temperature of about 10° to 25° C and at a pH of 10 to 12, and (iii) treating said vegetable matter at a temperature of about 40° to 60° C and at a pH of approximately 12.

21. A process according to claim 20 wherein the brown juice is heated to a temperature in the range of 70° to 95° C.

22. A process according to claim 1, wherein during the acid treatment of the brown juice, any inorganic or organic acid is used which is capable of providing a range of pH of from 3 to 6.

23. A process according to claim 22, wherein hydrochloric, sulphuric or trichloroacetic acid is used as the acid.

24. A process according to claim 16, wherein the brown juice obtained after the first pressing has an acid added thereto to adjust its pH to between 7.0 and 7.5, resulting in separate flocculation of the pigmented proteins present in the juice in small amounts, after which the flocculated proteins and a liquid effluent are separated, respectively in the form of a green cream and a depigmented brown juice, containing the cytoplasmic white proteins.

25. A process according to claim 24 wherein, the green protein cream is recovered, or recycled to the cake obtained during the second pressing, prior to dehydration thereof.

26. A process according to claim 25 wherein, in order to separate the cytoplasmic white proteins contained therein, the depigmented brown juice is treated by heating to a temperature of 70° to 95° C, after which a white protein cream is separated from the serum.

27. A process according to claim 25 wherein, to separate the cytoplasmic white proteins contained therein, the depigmented brown juice is treated by the addition of an acid adjusting the pH of the brown juice to a value of between 3 and 6, said acid being hydrochloric, sulphuric or trichloroacetic acid, or any equivalent organic or inorganic acid, following which a white protein cream is separated from the serum.

28. A process according to claim 27, wherein the cytoplasmic white protein cream is washed, then dried, to obtain a white protein concentrate in the form of a powder.

29. A process according to claim 13 wherein the sera obtained in the various steps are collected together, and then clarified, a portion of the clarified serum being recycled, after possible reheating, before the pressing or pressings, the residual amount of clarified serum being concentrated.

30. A process according to claim 13, wherein the recycled serum is reheated or has added thereto an alkaline agent such as sodium hydroxide, prior to being taken upstream of the pressing or pressings.

31. An integrated process for the treatment of leafy green vegetable matter, comprising the steps of:
  1. Treating a portion of the fresh vegetable matter in a strongly alkaline liquid medium and at a moderate temperature, said conditions permitting solubilization of the cytoplasmic proteins in the liquid reaction medium and flocculation of the pigmented proteins within the vegetable tissues;
  2. Pressing the hot medium obtained in step (1) and separating a brown juice and a first cake;
  3. Thermal treatment of said first cake in a liquid medium, the temperature being in the range of 80° to 90° C;
  4. Second pressing of the hot cake treated in (3), this producing a second cake and a serum, the said cake being suited to dehydration and conversion into agglomerated pellets,
  5. Treatment of the brown juice obtained after the first pressing (step (2) ) by the addition of an acid capable of adjusting the pH of said juice to between 7.0 and 7.5, this inducing a flocculation of the pigmented proteins present, in a small amount, in the said juice, and separating a green protein cream and a liquid effluent referred to as the pigmented brown juice;
  6. Concentrating the green protein cream separated in step (5) and/or recycling the said green cream to add it to the second pressing cake obtained in step (4);
  7. Treating the depigmented brown juice to separate the white cytoplasmic proteins contained therein, the said flocculation being realized by the thermal way (for example, by heating between 70° and 95° C, notably at 85° C) or by the acid way, by the addition of at least one acid capable of adjusting the pH of the brown juice to between 3 and 6, the said treatment providing, after separation, a white cream and a serum;
  8. Further treatment of the white cream by purification and drying to obtain a white protein concentrate;
  9. Treatment of the respective sera obtained from the second pressing (step (4)) and step (7), the said sera having been collected together and then clarified, one portion of the clarified serum being concentrated, while the residual portion is recycled to steps (1) and (3) to act as the liquid medium and as vector of calories, the recycled serum being, for this purpose, reheated and/or having an alkaline agent such as sodium hydroxide added thereto;
  10. Cold pressing the portion of the fresh vegetable matter not subjected to the treatment of step (1), providing a high-protein green juice and a third cake, which are separated;

11. Adding said third cake to the first cake, obtained in step (2), for then to undergo the treatment of step (3) together;

12. Further treatment of the green juice to flocculate all the pigmented and cytoplasmic proteins contained in said juice, the said treatment involving successively an alkalinization treatment to a pH of about 8.5, for example by the addition of ammonia, a thermal treatment inducing flocculation of the proteins, separating the protein precipitate and the serum, and conditioning the green cream separated to obtain a green protein concentrate;

13. Recovery of the serum separated in step (12) and its use in step (9).

32. A process according to claim 9 wherein the pH is about 12.

33. A process according to claim 9 wherein the alkaline agent is sodium hydroxide.

34. A process according to claim 12 wherein the time of sojourn is 15 minutes.

35. A process according to claim 13 wherein the alkaline agent is sodium hydroxide.

36. A process according to claim 15 wherein the time of sojourn is 15 minutes.

37. A process according to claim 16 wherein the acid is hydrochloric acid.

38. A process according to claim 21 wherein the temperature is 85° C.

39. A process according to claim 31 wherein the green vegetable matter is lucerne.

* * * * *

UNITED STATES PATENT OFFICE
CERTIFICATE OF CORRECTION

Patent No. 4,066,633                     Dated January 3, 1978

Inventor(s) Charles Gastineau et al.

It is certified that error appears in the above-identified patent and that said Letters Patent are hereby corrected as shown below:

On the title page the following should be added:

-- [30] Foreign Application Priority Data
   Nov. 4, 1974     France ........ 74 36627 --.

Signed and Sealed this

Tenth Day of October 1978

[SEAL]

Attest:

RUTH C. MASON
*Attesting Officer*

DONALD W. BANNER
*Commissioner of Patents and Trademarks*